May 3, 1932.  H. W. FLETCHER  1,856,627

CUTTER FOR EARTH BORING DRILLS

Filed May 24, 1927

Harold W. Fletcher Inventor

By Jesse R. Stone

Attorney

Patented May 3, 1932

1,856,627

UNITED STATES PATENT OFFICE

HAROLD W. FLETCHER, OF HOUSTON, TEXAS, ASSIGNOR TO HUGHES TOOL COMPANY, OF HOUSTON, TEXAS, A CORPORATION OF TEXAS

CUTTER FOR EARTH BORING DRILLS

Application filed May 24, 1927. Serial No. 193,800.

My invention relates to drill cutters for use on earth boring drills, and particularly to cutters employed in drilling relatively hard formation.

On drills now commonly used in drilling deep wells, cutters of a conical shape have been employed. These cutters are ordinarily two in number, so mounted and arranged upon the drill head as to have an opproximately true rolling motion upon the bottom of the hole. But on all such cutters the teeth on the cutting area have been arranged in rows longitudinally of the cutter and the teeth have diminished in size, or pitch from the base to the apex of the cone. The difficulty arising from this arrangement of the cutting teeth resides in the fact that the shorter teeth adjacent the apex of the cone at the center of the hole have little penetration into the formation being drilled. This will hold up the progress of the drill. Furthermore, the arranging of the teeth in rows longitudinally of the cutter face brings all the teeth in each row simultaneously into contact with the bottom of the hole, with the result that the weight of the drill does not obtain as good penetration. For a comparatively large number of teeth thus engaging the formation at once cannot penetrate so well as when the teeth are not arranged in rows, and the weight resting on each tooth is greater. It is also noted that when the teeth are arranged in rows longitudinally from apex to base of the cutter, the teeth are apt to "track" in the same depressions in the rock, each time the cutter makes its circuit about the well bottom. The effective cutting effort of the teeth is thereby diminished.

It is an object of the invention to so form and arrange the teeth upon a cutter of the character stated that the maximum of cutting effect may be obtained from each cutter.

It is desired to arrange the teeth upon the cutting area so that there will be effective penetration at all points upon the formation encountered, so that the center, as well as the outer surface of the well bottom, will be cut with equal effect.

Figure 1:
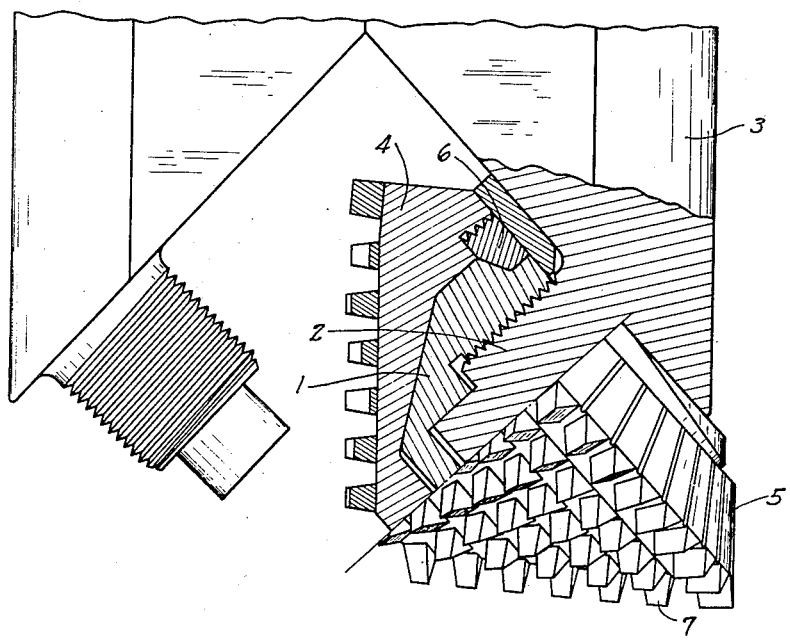
Figure 2:
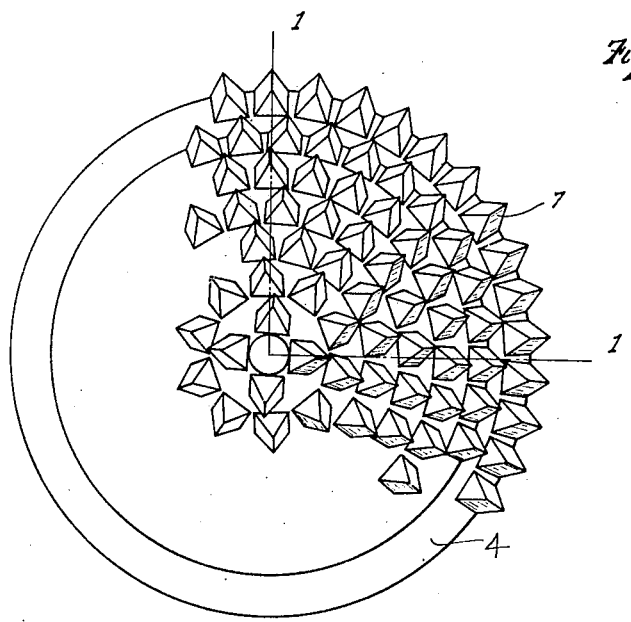

Referring to the drawings herewith for a better understanding of my invention: Fig. 1 is a broken lower end of a drill head having a cutter thereon embodying my invention, a section of the cutter being removed on the line 1—1 of Fig. 2. Fig. 2 is a top plan view of a cutter showing teeth formed on a portion of the cutting surface in accordance with my invention.

The construction and form of the body of the cutter employed with my invention does not differ from that of the usual conical cutter. There is a bushing 1 of frustoconical shape adapted to fit the interior of the cutter. Said bushing is mounted upon a shaft 2 formed upon the head 3 of the drill. The cutter body 4 is approximately conical upon its cutting area. Its base is beveled at 5 to contact with the side of the hole. A locking ring 6 screwed within a recess at the base of the cutter secures it rotatably upon the bushing.

The teeth 7 upon the cutting area are of approximately uniform size from apex to base of the cutter. They are formed in rows circumferentially about the apex as a center, but are not aligned longitudinally of the cutter.

The teeth are preferably of a chisel appearance, being shaped like a triangular prism, one of the sides forming the base for connection with the cutter body and one of the angles forming a cutting edge. The cutting edges are arranged radially along the cutter as shown in the drawings. The outer row of teeth adjacent the base may be slightly longer if desired, as shown, although the pitch is the same as that of the others.

The teeth may be welded upon the cone body as shown in Fig. 2, and this may be done by electric butt welding. I do not wish to be limited, however, to the manner in which the cutter is made.

I have found that a cutter thus formed with teeth of uniform pitch and in staggered arrangement longitudinally of the cone will have a superior cutting effect which is very marked as compared with the old type of cutter where the teeth were aligned and of smaller size adjacent the apex. All portions of the bottom of the hole are cut with equal effectiveness, and the irregular arrangement of the teeth assures that each tooth will engage the formation so as to get a proper penetration.

Having thus described my invention, what I claim as new is:

1. In a roller earth boring drill including a head having an inverted V-shaped recess in its forward end, cutter pins integral with said head in said recess, bushings on said pins, and conical-shaped cutters rotatable on said bushings; the combination of cutting teeth arranged in circumferential rows around said cutters, said teeth being formed all of approximately equal size, integral with said cutter, and out of alignment longitudinally of the cutter, so that the teeth will be prevented from tracking uniformly on the bottom of the hole.

2. In a roller earth boring drill having a head and two approximately frusto-conical cutters mounted on the forward end thereof to drill the full bottom of the hole, the combination of cutting teeth secured upon the outer surfaces of said cutters, said teeth being arranged in concentric rows, each having a lesser number of teeth than the next outer adjacent row, the teeth in each row being offset, relative to the adjacent teeth longitudinally of the cutter.

3. In a roller earth boring drill having a head and two approximately frusto-conical cutters mounted on the forward end thereof to drill the full bottom of the hole, the combination of cutting teeth secured upon the outer surfaces of said cutters, said teeth being arranged in concentric rows, each having a lesser number of teeth than the next outer adjacent row, the teeth in each row being out of alignment relative to other adjacent teeth longitudinally of the cutter and all said teeth being of approximately the same size.

4. In an earth boring drill having a head and a pair of cutter bushings mounted on the forward end thereof, approximately frusto-conical shaped cutters enclosing said bushings on their forward ends, and adapted to drill the full bottom of the well bore, coaxial rows of cutting teeth formed integrally with the outer cutting areas of said cutters, said teeth being of uniform size and welded to the outer surface of the cutters in offset relation relative to teeth of adjacent rows, longitudinally of the said cutters.

In testimony whereof, I hereunto affix my signature, this the 18th day of May A. D. 1927.

HAROLD W. FLETCHER.